Dec. 18, 1951  A. R. WEINRICH  2,578,956
METHOD OF FORMING METALLIC OXIDE COATINGS
UPON SILICEOUS SUPPORT ARTICLES
Filed Nov. 3, 1947
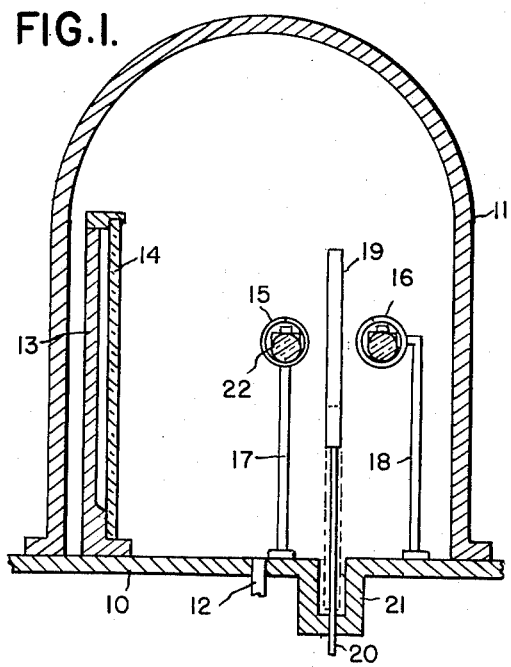
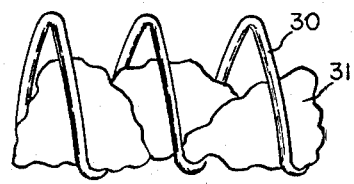
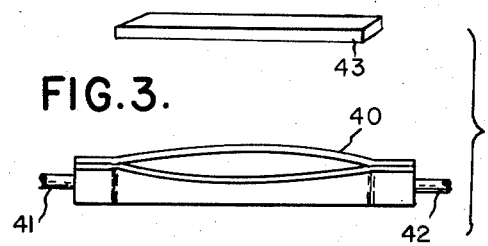
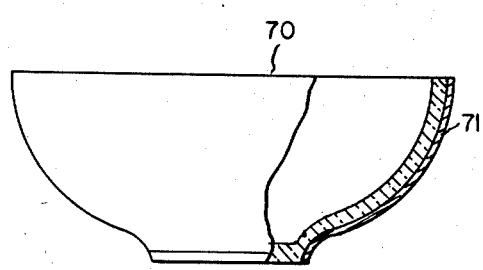
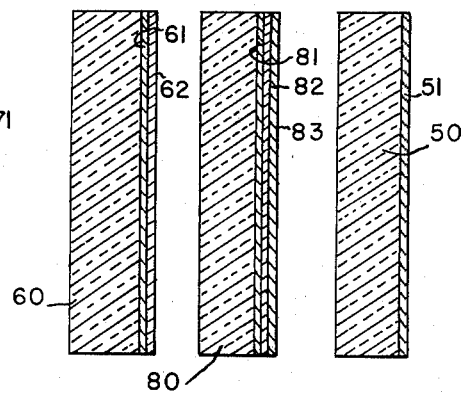
*INVENTOR.*
ARTHUR R. WEINRICH
BY
Whittemore, Hulbert
& Belknap
ATTORNEYS Patented Dec. 18, 1951

2,578,956

UNITED STATES PATENT OFFICE 2,578,956

METHOD OF FORMING METALLIC OXIDE COATINGS UPON SILICEOUS SUPPORT ARTICLES

Arthur R. Weinrich, Brackenridge, Pa., assignor to Libbey-Owens-Ford Glass Company, Toledo, Ohio, a corporation of Ohio Application November 3, 1947, Serial No. 783,841

16 Claims. (Cl. 117—35)

This invention has to do with a method of forming metallic oxide coatings upon siliceous support articles.

Thermally evaporated coatings of certain metallic oxides deposited upon glass or other siliceous supports by evaporation in a vacuum have been found to be of interest by reason of their optical characteristics, their hardness, and their stable nature as mirror reflective coatings, as coatings in low reflection coated articles, as durable protective coatings upon such articles, and in various other articles and uses as coatings. In such articles the use of the highly oxidized solid metallic oxide coatings of aluminum trioxide, titanium dioxide, chromium sesquioxide, tin dioxide, zirconium dioxide, and antimony tetraoxide is particularly desirable and for certain uses coatings of the similar higher oxides ferric trioxide, tantalum pentaoxide, tungsten trioxide, manganese oxide, and the aluminum oxide spinels are attractive. Each of these metallic oxides is the higher oxide of the metal in each case which is stable under atmospheric conditions and excepting the chromium and manganese oxides are generally colorless or of light color. However, when coatings of these materials are formed by thermal evaporation of the substances in a vacuum the coatings thereby produced are darker than would be expected and are found to absorb considerable light and further the reflective properties and their activity in low reflection coatings in combination with other layers is not what would be expected based upon their normally given refractive indices.

At the same time, deposition by thermal evaporation is very desirable by reason of the accuracy and fineness of control possible in depositing extremely thin, uniform, continuous coatings. Furthermore, in the production of a highly oxidized metallic film, the deposition by thermal evaporation of a metal oxide is preferable to the initial deposition of a metal, followed by oxidation. Metals tend to short out on the filament, giving rise to variable temperatures and non-uniform conditions. This is not true of the oxides and thus accurately controllable conditions can be attained. In addition, some metals such as antimony do not "wet" the filament, and are hard to evaporate. Most important, however, is the fact that it is difficult if not impossible as a practical matter to effect complete oxidation of a metal film to the desired higher oxide.

The present invention thus relates to a method of forming partially transparent coatings of these above listed various highly oxidized solid metallic oxides which are substantially completely composed of such higher normally stable metallic oxides and which as a result have a minimum degree of light absorption. I have found that while many of the simple lower oxidized metallic oxides such as zinc oxide, beryllium oxide, sodium oxide, ferrous oxide, or titanium monoxide may be thermally evaporated in a vacuum without decomposition and loss of the oxygen, the higher oxygen-containing or more highly oxidized solid metallic oxides above described while stable when heated in air are unstable in a vacuum when heated and thermally evaporated losing some oxygen and the coatings then deposited upon the article to be coated by thermal evaporation are formed either primarily or to some degree of some lower oxide of these metals and these lower oxides are generally of a dark color and the coatings are thus caused to absorb considerable light. As such lower oxides are of considerably different refractive index than the refractive index of the desired higher oxidized metallic oxides the optical reflection activity of the coatings either in a mirror or a low reflection coated article are thus different from that desired in the coatings. Thus thermal evaporation of yellow or black titanium monoxide or of the green black titanium sesquioxide or of the colorless white titanium dioxide gives coatings which at the same thicknesses are of about the same reflection and light transmission characteristics. Oxygen is lost from the two higher oxides during the thermal evaporation as may be noted from the vacuum gauges indicating the vacuum becoming poorer during the thermal evaporation as gas is generated as the oxides evaporate and partially decompose. On the other hand, as soon as the deposits begin to form there immediately follows an improvement in the vacuum as the oxygen is again absorbed to some degree by a partial recombination of the lower oxides in the deposit with oxygen. It would thus seem that in all three cases the coatings secured by thermal evaporation of the different titanium oxides were largely formed of a mixture of titanium oxides including some of the lower oxides and probably titanium monoxide. In a similar manner, thermal evaporation in a vacuum of ferrous oxide (FeO) or of ferric trioxide ($Fe_2O_3$) seems to give the same type of coatings which appear to be mainly ferrous oxide as loss of oxygen from the ferric trioxide is evidenced by the vacuum gauge reading variation when the latter material is evaporated thermally in a vacuum.

When coatings upon glass or other vitreous siliceous support articles such as porcelain, tile, ceramic, earthenware, aluminum silicate, calcium silicate, mica, or silica which are heat resistant bodies, are first formed by thermal evaporation in a vacuum by the evaporation of either one of the lower metallic oxides, such for example as titanium monoxide, or of one of the higher metallic oxides listed in the first paragraph, such as titanium dioxide for example, I have found that the undesired or high light absorbing deposit thus secured may be changed into the desired less light absorptive coating of the higher more highly oxidized solid metallic oxide substantially or completely by heating the coated support surface in an oven or furnace in contact with air, oxygen, or an oxygen-containing atmosphere at temperatures of above 100° centigrade up to a temperature just below the melting point of the support article, such as 800° centigrade. The coating of lower oxide or of mixed oxides containing some lower oxide is thus oxidized to a coating of the more desired highly oxidized solid metallic oxide which is stable under such conditions of heating in air or the presence of oxygen.

In general then the invention comprises the method of forming coatings and preferably partially transparent coatings of a desired minimum light absorption upon the surface of a vitreous siliceous support article such as glass, silica, or the like, in which a coating is first deposited upon such support by the thermal evaporation within a vacuum from a heat radiating support body of a metallic oxide which is thereby heated, the metallic oxide being an oxide of a metal which is characterized by forming metallic oxides of several different states of oxidation or oxygen content such as any of the oxides of aluminum, titanium, chromium, tin, zirconium, antimony, iron, tantalum, tungsten, manganese, or mixtures of any of these together or in chemical combination with other metallic oxides such as aluminum oxide with other metallic oxides in the spinels and thereafter subjecting the coated support article and deposit, which deposit will include therein a metallic oxide of low oxidation state, to a heating in an oxygen-containing atmosphere at a temperature in excess of 100° centigrade and below the melting or softening point of the support to oxidize the deposit to form the desired coating or partially transparent coating upon the article, the coating thus produced being composed substantially of the normal stable highly oxidized solid metallic oxide which with the respective metallic oxides listed would be aluminum trioxide, titanium dioxide, chromium sesquioxide, tin dioxide, zirconium dioxide, antimony tetraoxide ($Sb_2O_4$) or antimony pentaoxide ($Sb_2O_5$), ferric trioxide, tantalum pentaoxide, tungsten trioxide, manganese sesquioxide ($Mn_2O_3$) or manganous manganic oxide ($Mn_3O_4$), mixtures of these highly oxidized metallic oxides together or in combination with other metallic oxides in spinels, such, for example, as aluminum trioxide with other metallic oxides. Further examples of the spinels which may be looked upon as combination of metallic oxides may be found at pages 687–712 in Dana's System of Mineralogy, Seventh Edition, published in 1946 by John Wiley & Sons, such for example as spinel ($MgO$—$Al_2O_3$), Franklinite ($ZnO$—$Fe_2O_3$), and chromite ($FeO$—$Cr_2O_3$).

The higher oxides of the specified metals, possibly by reason of their higher oxygen content, are generally of lower refractive index and almost invariably of lighter colors than the lower oxides of the same metals. In thin coatings the lower oxides of deeper colors are thus more light absorptive and the presence of such in the metallic oxide coatings as secured by direct thermal evaporation in a high vacuum is thus objectionable. By my invention the desired coatings of the more highly oxidized metallic oxides which are of generally low light absorption are thus secured substantially free of the undesired lower oxides. It will be apparent that where several higher oxides of a metal can be formed upon heating the metal oxides in air or oxygen containing atmosphere that appropriate heating at suitable temperatures and pressures will be employed to secure a coating of the desired oxide. As will appear later, the alternative forming of a deposit of antimony pentaoxide or of antimony tetraoxide may be accomplished by the thermal evaporation of an antimony oxide material and the heating of the deposit in air thereafter by a suitable choice of temperature and pressure at which one or the other of these higher oxides of antimony are normally formed and stable. Similarly, while manganese is known to form several higher unstable oxides such as $Mn_2O_7$ which is an unstable oil, $MnO_3$ and $MnO_2$ which are decomposed also by heating in air and a low oxide $MnO$ it is apparent that when I heat my manganese oxide deposits secured by thermal evaporation of a manganese oxide I will not form any of these higher unstable oxides of manganese and that I will oxidize any managanous oxide $MnO$, etc., in my deposits to one of the normally stable higher oxides of manganese which are manganese sesquioxide or manganous manganic oxide. The product secured in this case will be the sesquioxide as a coating if the oxidation is carried out in oxygen and with air oxidation will be the manganous manganic oxide. The choice of heating conditions may thus be used to arrive at a choice of various higher oxidized metallic oxide coatings in some cases. Obviously by raising the temperature during the oxidation heating I may accomplish the desired oxidation in the deposit to secure my desired coating in a shorter time or I may if preferred carry the step out at a lower temperature for a much longer time. As the coating thickness which is treated during the oxidation heating is increased the length of time of treatment may be increased and the temperature of treatment may be increased to secure the desired substantial conversion of the lower oxides in the thermally evaporated deposit to the higher oxidized metallic oxides. If desired I may also accelerate the oxidation of the deposit to the desired oxidized coating by also employing the oxygen, air or other oxygen containing atmosphere at pressures somewhat greater than atmospheric and it will also be apparent that the oxygen containing atmosphere may be used in the oxidation at pressures somewhat less than atmospheric but ordinarily not less than 50 millimeters partial pressure of oxygen.

It is an object of this invention to provide a method for producing coatings of the higher metallic oxides upon supports by thermal evaporation.

It is a further object of the invention to provide a method for forming coatings of the higher metallic oxides which are substantially such and partially transparent and of a minimum light absorption.

As another object of the invention the method of forming coatings upon smooth transparent supports of the higher metallic oxides is shown as a means of thereby producing partially transparent mirrors.

As a further object the method is provided for the coating of mirror reflective surfaces upon suitable supports for the forming of mirror articles having a protective face thereon of a coating of a higher metallic oxide which is desirably of minimum light absorption and partially transparent.

The process applies the advantages of thermal evaporation of materials in a high vacuum to secure even, uniform, continuous coatings and by the oxidation step overcomes the difficulties of high light absorption and the presence of undesirably large amounts of lower metallic oxides in such coatings when the metallic oxides are thus applied. The various advantages and uses of the process will be more apparent from the following examples which are illustrative but not limiting thereby.

By way of indicating how I may proceed with the compounds known as spinels or with mixtures of metallic oxides I may evaporate within a vacuum a magnesium spinel which consists of magnesium oxide in combination with a molecule of aluminum trioxide or I may directly evaporate a simple intimate mixture of molecular equivalent quantities of powdered magnesium oxide and powdered aluminum trioxide and in either case the deposited coating will be found to become less light absorptive upon heating the support carrying the deposit at 400° centigrade in air. In each case the dark lower oxide of aluminum present in the deposit first formed by thermal evaporation in the vacuum, which is presumed to be aluminum monoxide (AlO), is thereby oxidized to the colorless aluminum trioxide ($Al_2O_3$) and the spinel is then reformed in the coating thus secured by reaction in the heated deposit with the magnesium oxide.

Dark monoxides of the metals seem to be formed to some degree as many of the higher metallic oxides are thermally evaporated and appear to be the source of the undesirable light absorption in the deposits thus secured directly. Thus aluminum monoxide (AlO) is a very deep black substance, the product titanium monoxide (TiO) is a deep black substance or a yellow substance, chromium monoxide (CrO) is also black, stannous oxide (SnO) is black, ferrous oxide (FeO) is a dark black green, and the manganous oxide (MnO) is a dark green black. Possibly other dark monoxides of some of the other metals exist. All such oxides oxidize easily when heated as suggested hereafter.

Figure 1 shows in section a suitable thermal evaporation apparatus or vacuum chamber for carrying out the process having therein suitable evaporation elements which may be electrically heated to cause evaporation of materials placed thereon.

Figure 2 shows a suitable evaporation filament which may be of tungsten or tantalum and which carries thereon a metallic oxide for evaporation or a metallic compound which when heated will form a metallic oxide.

Figure 3 shows another suitable form of evaporation element comprising a boat of tungsten, tantalum or molybdenum, which has therein a suitable intimate mixture of metallic oxides for thermal evaporation of the mixture.

Figure 4 shows a plate after it has been processed in accord with the invention by heating an oxide deposit in contact with an oxygen containing atmosphere at an elevated temperature and carrying thereon a solid coating thus produced which is substantially higher metallic oxide in a continuous layer.

Figure 5 shows a metallic mirror after it has been processed in accord with the invention by heating an oxide deposit in contact with an oxygen containing atmosphere at an elevated temperature and carrying upon the unaltered reflective layer a coating thus produced of a solid highly oxidized metallic oxide.

Figure 6 shows a ceramic bowl, partly in section, having thereon a coating produced in accord with the invention of a highly oxidized metallic oxide which gives the bowl a protection from wear and a high reflection or luster.

Figure 7 is a transverse section through a plate provided with a plurality of coatings, one or more of which are produced in accordance with the present invention.

Referring now to the drawings, there is shown in Figure 1 a suitable apparatus for carrying out the present invention. Mounted upon a plate 10 and in sealed relation therewith is a bell or chamber 11 within which a vacuum is maintained. At 12 there is indicated a connection to a suitable vacuum pump (not shown) for evacuating the interior of the bell 11. Within the vacuum in the bell and herein illustrated as carried by the plate 10 is a support 13 adapted to support an article 14. The article 14 may conveniently be a plate of vitreous siliceous material, such for example as glass.

Within the vacuum chamber 11 are a pair of heating filaments 15 and 16 carried by supports 17 and 18, respectively. Intermediate the filaments 15 and 16 there is illustrated a plate or shield 19 movable between the full and dotted line positions shown and adapted to be moved between such positions by an actuating element 20. A well 21 is provided to permit downward movement of the shield 19 to a position where it permits deposit by thermal evaporation upon the surface of the element 14 from material contained within the filament 16.

The apparatus illustrated is effective to carry out the first step of the herein disclosed method. Thus, for example, an oxygen containing metal compound such as indicated at 22 may be located within the filament 15 and heated thereby to effect deposit of metallic oxide, including a lower oxide, on the exposed surface of the element 14. Following deposition of the metallic oxide on the surface of the element 14, the second step of the operation is carried out by heating the surface of the element 14 in an oxygen containing atmosphere to oxidize the lower metallic oxide or oxides to the desired higher metallic oxide.

The apparatus illustrated in Figure 1 may be used to produce an article having a surface thereof provided with two dissimilar coatings, the outer one of which may be the highly oxidized metallic oxide coating disclosed herein. Thus, for example, the article 14, which may be a plate of glass, may have deposited thereon by thermal evaporation from the filament 15 a reflective mirror coating. At this time the shield 19 may be in the full line position which prevents deposition of thermally evaporated material onto the filament 16 from the filament 15. After the desired mirror coating has been deposited upon the surface of the article 14, the filament 15 is deenergized, the shield 19 is moved away from its shielding position intermediate the filaments 15 and 16, and the filament 16 which contains the desired material for depositing metallic oxide may be energized. Thus the metallic oxide is deposited directly upon the reflective mirror coating. In any event, after deposition of the metallic oxide coating the article 14 is heated in an oxygen containing atmosphere and preferably by means of a flame or in an electric oven under atmospheric pressure so as to oxidize the lower metallic oxides to the desired higher metallic oxide.

In Figure 2 there is illustrated apparatus suitable for effecting thermal evaporation of the metallic oxide, metallic compound or the like. In this figure there is illustrated a coiled filament 30 which may be formed of tungsten, tantalum or the like and which is adapted to support pieces 31 of the material to be evaporated. Energization of the filament 30 results in heating the pieces 31 to a high temperature with the result that a metallic oxide or metallic oxides are evaporated. The filaments 15 and 16 illustrated in Figure 1 may be identical with the filament 30 illustrated in Figure 2.

Referring now to Figure 3, there is illustrated an evaporation element comprising a boat 40 which may be formed of tungsten, tantalum or molybdenum. The boat 40 is provided with conductors 41 and 42 by means of which current is supplied thereto. The material to be evaporated by thermal evaporation is placed within the boat 40 and in this case the evaporated metallic oxide is evolved upwardly. In the figure there is illustrated at 43 an article to be coated by thermal evaporation and it is shown in position directly above the boat 40 in best position to receive metallic oxide deposit therefrom.

Referring now to Figure 4, there is illustrated an article in the form of a plate 50 provided with the coating 51 of metal oxide. This article results from deposition by thermal evaporation such as, for example, produced by the apparatus illustrated in Figure 1, employing a filament such as that shown at 30 in Figure 2, a boat such as that shown at 40 in Figure 3 or other means.

In Figure 5 there is illustrated a reflective mirror produced in accordance with the present invention. In this case the support article 60 is in the form of a smooth surfaced plate to which is applied a reflective mirror film 61 which may if desired be of metal. Overlying the reflective mirror film 61 is the metallic oxide film 62 produced in accordance with the method disclosed herein. In this case the mirror illustrated is preferably a first surface mirror and the provision of the metallic oxide coating 62 protects the reflective mirror coating 61. At the same time due to the relatively low light absorption resulting from the oxidation of lower metallic oxides to the desired higher metallic oxides the efficiency of the mirror is not appreciably reduced by the protective coating applied thereto.

Referring now to Figure 6, there is illustrated a ceramic bowl 70, a portion of which is broken away to illustrate the relationship of parts. The metallic oxide coating 71 is illustrated as applied to the exterior of the bowl so that it protects the bowl from wear and may impart thereto a high reflection or luster.

Figure 7 shows an article 80 to which three successive coatings 81, 82 and 83 of solid highly oxidized metallic oxide have been applied by separate retreatment or preferably by the successive thermal deposition of dissimilar metallic oxide materials within one continuous vacuum followed by a single oxidation of all three applied coatings by then subjecting the deposits to an oxygen containing atmosphere at a suitable pressure and at an elevated temperature. By proper choice of the metallic oxide materials comprising the respective coatings and by the choice of suitable thicknesses of each of the coatings, articles of high or low reflection properties may be obtained.

Obviously one or more of the coatings may be of other transparent materials such as metallic monoxides of fluorides which are stable under the oxidizing treatment and not thereby altered. Thus, for example, the intermediate layer 82 in Figure 7 may be beryllium oxide (BeO) or magnesium fluoride ($MgF_2$) while layers 81 and 83 may be any of the higher metallic oxides described herein.

While specific apparatus has been illustrated for carrying out the initial step of deposition by thermal evaporation, the apparatus for carrying out the second step has not been illustrated. The second step involves the heating of the coated surface in an oxygen containing atmosphere which may be accomplished as previously stated by flame, an electric furnace or the like. Preferably, however, the final heating step to produce the desired highly oxidized metallic oxides is carried out at atmospheric pressure. One reason for this is that certain of the higher metallic oxides which are stable under atmospheric pressure, will be unstable when heated within a vacuum.

EXAMPLES 1 TO 4

Four pieces of cleaned plate glass were placed within a vacuum chamber with a smooth surface of the glass facing a tungsten coil filament containing 0.200 gram of aluminum trioxide pieces. Two of the sheets of such glass supports were placed 14 inches away from the filament and two were placed at 22 inches away to secure a lighter coating. The chamber was then closed and the plates were then given a glow discharge cleaning in a poor vacuum and thereafter the vacuum was further improved to about $10^{-4}$ mm. Hg pressure or lower and the coil containing the aluminum trioxide was then heated electrically to a high temperature to supply heat by radiation and direct contact to the aluminum trioxide and to cause it to evaporate. As the evaporation started there was noted upon the vacuum gauges attached to the vacuum chamber the development of a surge of gas as oxygen was liberated from the heated oxide and thereafter the vacuum again improved somewhat as oxygen was absorbed to some degree by the deposit being formed upon the glasses. When the coated glasses were removed from the vacuum chamber the coatings were clear, non-metallic, and evidently composed of aluminum oxides. Measurements of the reflection and light transmission characteristics were then made and one of each set of the glasses was then subjected to oxidation by heating the coating directly by applying a Bunsen burner gas flame directly upon the coating in the air. As will be seen from the following table of measurements the reflectivity and transmission measurements changed indicating that some lower oxide of aluminum present in the deposited coating was thus oxidized and changed into the highly oxidized aluminum trioxide. The changes were greater and the oxidation substantially complete when the other two coated glasses were heated in air in an electric oven at 370° centigrade for 15 minutes as appears in the table. In each case the oxidation of the coating will be seen to have reduced the light absorption of the coatings as the less light absorptive colorless aluminum trioxide was thus formed from the lower oxides of aluminum present in the coating with aluminum trioxide. Aluminum monoxide is a dark brown black light absorbing substance. The coatings thus produced were hard and weather resistant and the coated glasses could be used directly as partially transparent mirrors. The coatings thus applied to the glass plates could also by the further application of other coatings thereupon of transparent materials of different refractive index be built up into a low reflection coated glass article in ways known to the art, the reduced light absorption character of the aluminum trioxide coating thus produced being highly desirable for such applications.

As the refractive index of aluminum trioxide is 1.77 and an optical thickness of coating of a quarter wave length factor is determined by dividing the wave length of light ($\lambda$) by 4 and also by the refractive index (N) of the coating it will be seen that the coatings of Examples 3 and 4 were thus one quarter of a wave length thick with respect to visible light of 5500 Angstrom units. As color is developed by light interference in the reflected light when the coating thickness is a whole odd integer number such as 1, 3, 5, 7 or 9 times the quarter wave factor $$\frac{\lambda}{4N}$$

and the wave length is one occurring in visible light of 4000 to 7500 Angstrom units wave length it is apparent that the partially transparent mirrors produced as Examples 3 and 4 are also colored mirrors and each was found to have a red purple red color by reflection.

the spinel from the heated tungsten coil at a vacuum of about $10^{-5}$ millimeters. As the evaporation started there was noted upon the vacuum gauges attached to the vacuum chamber the development of a surge of gas as oxygen was liberated from the heated material and thereafter the vacuum again improved somewhat as oxygen was absorbed to some degree by the deposit being formed upon the glasses. The spinel evaporates completely so that the magnesium oxide content thereof as well as various aluminum oxides were evidently present in the clear coatings found upon the glass sheets when they were removed from the chamber. Measurements of the light reflection and transmission and absorption of the coated pieces were made directly on the coated glass supports and also upon sets of these glasses which were in one case directly oxidized in air by the application of an illuminating gas bunsen flame directly to the coating surface and in a second set which were oxidized by placing the coated glasses in an electric oven at 370° centigrade for 15 minutes. The measurements in the following table show that the oxidation of the coatings gave final coatings of decreased light absorption and of changed light reflection and light transmission characteristics. The heating and oxidation of the coatings would thus seem to have oxidized any lower oxides of aluminum present in the coatings and to have caused a reaction between the aluminum trioxide formed by the oxidation or directly present with the magnesium

*Aluminum trioxide coatings*

| Example No. | Coating Distance, Inches | Coating Thickness, Microns | Oxidation Step | Per Cent Light Transmission | Per Cent Front Surface Reflection | Per Cent Light Absorption |
|---|---|---|---|---|---|---|
| 1 | 22 | | None | 88 | 11 | 1 |
|  | 22 | .031 | Flame | 88.5 | 10.5 | 1 |
| 2 | 22 | | None | 88 | 11 | 1 |
|  | 22 | .031 | Oven | 90 | 10 | 0 |
| 3 | 14 | | None | 78 | 17.4 | 4.6 |
|  | 14 | .076 | Flame | 79 | 17.4 | 3.6 |
| 4 | 14 | | None | 78 | 17.4 | 4.6 |
|  | 14 | .076 | Oven | 80 | 16.8 | 3.2 |

When the specimen of Example 4 was further heated in an oven at 425° centigrade for one hour, light absorption was reduced to 0%.

oxide present to form a coating of the spinel or magnesium aluminate. The coatings were very hard and durable and suitable for use in forming

*Spinel coated glass sheets*

| Example No. | Coating Distance, Inches | Coating Thickness, Microns | Oxidation Step | Per Cent Light Transmission | Per Cent Front Surface Reflection | Per Cent Light Absorption |
|---|---|---|---|---|---|---|
| 5 | 22 | | None | 83 | 14 | 3 |
|  | 22 | .108 | Flame | 84 | 14.2 | 1.8 |
| 6 | 22 | | None | 83 | 14 | 3 |
|  | 22 | .108 | Oven | 88 | 12 | 0 |
| 7 | 14 | | None | 73 | 15 | 12 |
|  | 14 | .266 | Flame | 74 | 15.8 | 10.2 |
| 8 | 14 | | None | 73 | 15 | 12 |
|  | 14 | .266 | Oven | 79 | 16 | 5 |

EXAMPLES 5 TO 8

In a similar manner to the preceding examples, four plates of clear clean glass were coated by evaporating from the tungsten coil a charge of 0.663 grams of the spinel commonly known as spinel which is a magnesium aluminate $MgO-Al_2O_3$ composed of a molecule of magnesium oxide and a molecule of aluminum oxide. This metallic oxide composition or compound like the other spinels or metallic aluminates such as those of calcium or zinc thus contains or includes aluminum oxide in its composition. A glow discharge cleaning of the glass plates was first carried out before the actual evaporation of low reflection coatings upon the glass sheets and useful as the directly formed spinel coated sheets as partially transparent mirrors of very good durability and weather resistance.

In Examples 7 and 8 the coatings were of a thickness of 3 quarter wave length factors with respect to light of 6000 Angstrom units and the mirrors were colored as viewed by the reflections therein.

Further treatment of Example 8 at a higher temperature in the oven and for a longer time resulted in further decreases in the light absorption to less than 1% of the coated glass as some further oxidation was secured. However, the above products were substantially coatings upon the glass of the desired spinel. In other similar runs other spinels such as calcium aluminate were distilled by thermal evaporation within a vacuum upon glass sheets and the coated glasses were thereafter heated in an electric oven at approximately 400 centigrade in air to reduce the light absorption of such coating and to reform the desired spinel in the coating.

EXAMPLES 9 TO 11

In three separate thermal evaporations carried out at different times sheets of glass, sheets of silica and a shaped ceramic bowl were given coatings of hard durable aluminum trioxide by the upwards evaporation of aluminum oxide compositions or compounds from a tungsten boat heated by electrical resistance within a vacuum chamber. The compounds employed were in each case inherently capable of being reactively decomposed to aluminum oxide when heated such as the hydroxide, nitrate, formate, acetate or lactate of aluminum. Thus the glass sheets were coated with aluminum oxides by thermally evaporating from the heated boat in the vacuum aluminum acetate $Al(C_2H_3O_2)_3$ which decomposed in the vacuum under the heating into aluminum oxides. The coated glass sheets were then oxidized by heating the same in an air furnace at 100° centigrade for a week with resultant decrease in the light absorption of the coating as it became oxidized. Aluminum nitrate $Al(NO_3)_3$ was used in the coating of the sheets of the silica with aluminum trioxide by applying the compound to the tungsten boat as a support which was thereafter heated in the vacuum causing decomposition of the nitrate to aluminum oxide which was then thermally evaporated by raising the temperature of the boat to a further degree. The coated silica sheets were then treated to a brief treatment upon the coating with an oxy-hydrogen flame to bring about the desired oxidation and changes in optical character of the coated article. The ceramic bowl was coated by rotating the same during the thermal evaporation and by placing in the boat aluminum hydroxide $Al(OH)_3$ which in the vacuum at a low heat lost its water content and formed aluminum trioxide which was then thermally evaporated by raising the temperature of the boat to a high temperature. The coated bowl was then placed in a chamber through which heated oxygen at 200° centigrade was passed for several hours to oxidize the coatings and to permit the securing thereon of a hard durable protective coating of aluminum trioxide primarily which was then durable, weather resistant and reflective.

EXAMPLES 12 TO 16

Within a high vacuum chamber there were placed five pieces of clean glass having a smooth polished surface, the pieces being arranged at varying distances as hereafter shown from the evaporation source which was a tungsten filament. Into the latter there was placed some antimony trioxide with the object of forming upon the glass sheets a coating of antimony tetraoxide, a higher oxide of antimony. After the vacuum chamber was closed the glass sheets were cleaned by a glow discharge treatment and the antimony oxide was then thermally evaporated at $10^{-3}$ to $10^{-5}$ millimeters at a low red heat. However, oxygen seems to be lost from the antimony trioxide upon such thermal evaporation within a vacuum as the deposits upon the glass are quite light absorptive, as will be seen in the following table. Sufficient of the antimony trioxide was evaporated such that the heaviest coating secured was, after a further oxidation treatment by heating the coated glasses for one hour in an air furnace at 425° centigrade, of a thickness of about one-quarter of a wave length of visible light of 5700 Angstrom units or approximately .070 micron thick. After such an oxidation treatment the light absorption of the coated glasses was negligible. When antimony oxides are heated in air a pentaoxide is formed if the heating is below 380° centigrade and above this temperature and up to 930° centigrade antimony tetraoxide is stable and formed. Thus any of the antimony trioxide or any other lower oxide of antimony present in the coating formed in the thermal evaporation was by the oxidation at 425° centigrade substantially oxidized into the more highly oxidized stable solid antimony tetraoxide. The latter substance has a refractive index of 2.00 whereas antimony trioxide has a higher refractive index of 2.08 to 2.35 and in line with the oxidation of the coating forming the lower index material it will be noticed that the reflection of the coated article decreases generally at these thicknesses as would be expected with a decrease in the refractive index. It is apparent that if I had desired to form a coating of antimony pentaoxide instead of one of antimony tetraoxide I would oxidize the thermally deposited coating in contact with air or oxygen at an elevated temperature below 380° centigrade. The coated glass article produced as Example 16 showed a pale yellow color by reflection and a pale blue color by transmission thereby indicating the approximate thickness of coating indicated and also showing that since such color by reflection was an interference color that the article could be used in the forming of a colored mirror. As such it and the other coated glass articles so produced are directly useful as partially transparent first or second surface mirrors, as the coatings were very hard and durable. Likewise, for example, there may be placed upon the filament, boat or other evaporation support a salt of antimony such as the sulfate or tartrate which will when heated in the vacuum decompose to provide antimony oxide.

*Antimony oxide coated glass sheets*

| Example No. | Coating Distance, Inches | Coating Thickness, Microns | Oxidation Step | Per Cent Light Transmission | Per Cent First Surface Reflection | Per Cent Light Absorption | Second Surface Mirror Reflection |
|---|---|---|---|---|---|---|---|
| 12 | 20 | | None | 66 | 28 | 6 | 20 |
|    | 20 | .026 | Oxidized | 88 | 14 | 0 | 13.5 |
| 13 | 17.3 | | None | 58 | 35 | 7 | 26 |
|    | 17.3 | .035 | Oxidized | 81 | 19 | 0 | 18 |
| 14 | 15.8 | | None | 53 | 37 | 10 | 28 |
|    | 15.8 | .042 | Oxidized | 77.5 | 22.5 | 0 | 21.5 |
| 15 | 14.1 | | None | 50 | 38 | 12 | 28 |
|    | 14.1 | .0525 | Oxidized | 75 | 25 | 0 | 23.9 |
| 16 | 12.25 | | None | 48 | 34 | 18 | 18 |
|    | 12.25 | .070 | Oxidized | 75.5 | 24.5 | 0 | 23.7 |

EXAMPLE 17

A clean glass plate was placed in a vacuum chamber and thereupon cleaned further by an electric glow discharge. After this there was thermally evaporated from a tungsten filament in a good vacuum some stannic oxide or tin dioxide and a deposit secured upon the glass plate. When the coated glass plate was removed from the vacuum chamber and measured for light transmission it showed 78% light transmission. It also had a first surface reflectivity of 20% and thereby had a light absorption of 2%. When this coated plate was then heated in an oven at 500° centigrade the front surface reflection remained the same but the light transmission increased to 79% and the light absorption decreased to 1%. Thus oxidation changed the optical properties of the coating upon the glass indicating an oxidation to have taken place, and thereby giving a coating upon the glass which was substantially the higher tin dioxide.

oxygen lost during the thermal evaporation of the higher tungsten trioxide in the vacuum was again supplied to the coating by the oxidation in air to form in the coating tungsten trioxide.

In order to further bring out the changes brought about by the several steps, a second similar run with three other pieces of glass was made applying the same amount of the tungsten trioxide, however, directly upon the similarly placed glass sheets and omitting the aluminum coating. Thus tungsten oxide coatings of a light to a deep blue shade were directly formed upon the glass and clearly contained some of the lower tungsten oxide or was primarily formed of the blue oxide. After making optical measurements upon these glasses they were heated in the oven in a similar manner at 250° centigrade to oxidize the coatings which lost all blue color and became a faint yellow only by light transmission. The change in the measured values with respect to the reflection, transmission overall of white light, and absorption appears in the following table.

*Tungsten oxide coated glass sheets*

| Example No. | Coating Distance, Inches | Coating Thickness, Microns | Oxidation Step | Per Cent Light Transmission | Per Cent Front Surface Reflection | Per Cent Light Absorption |
|---|---|---|---|---|---|---|
| 21 | 20 | .070 | None | 78 | 21 | 1 |
|    | 20 |      | Oxidized | 78 | 23.5 | 0 |
| 22 | 14 | .141 | None | 77 | 9.5 | 13.5 |
|    | 14 |      | Oxidized | 87 | 11 | 2 |
| 23 | 10 | .282 | None | 62 | 10 | 28 |
|    | 10 |      | Oxidized | 84 | 13 | 3 |

EXAMPLES 18 TO 23

First surface mirrors of aluminum having a coating of tungsten trioxide on the face of the aluminum were made by placing three clean smooth surface plates of glass in a vacuum chamber at different distances away from the two tungsten evaporation filaments therein. One of the filaments was loaded with a considerable amount of aluminum and in the second filament was placed 0.7 gram of the light yellow tungsten trioxide. After the chamber was closed the glass plates were cleaned further by an electric glow discharge preferably, although this might be omitted, and then the vacuum was reduced below $10^{-3}$ millimeters and the aluminum was thermally evaporated in a sufficient amount to give an opaque reflective mirror coating of aluminum on all of the glass plates. After the aluminum evaporation was stopped the filament containing the tungsten trioxide was heated by passing an electric current through the filament and as the tungsten trioxide evaporated the vacuum gauges attached to the chamber indicated the liberation from the metallic oxide of a gas which was oxygen. When the coated mirrors were removed from the vacuum chamber the mirrors had a general strong blue color and when these mirrors were then heated in an oven in air at 250° centigrade for 15 minutes to 30 minutes, which did not alter the aluminum coating, the blue color disappeared and was replaced by a light yellow predominant shade. With these stronger colorings in the tungsten oxide coatings due to selective colored light absorption other less prominent interference colors were also evident by reflection. The blue color is characteristic of the lower oxide of tungsten known as the blue oxide and reported to be $W_3O_8$ or a lower oxide than the yellow tungsten trioxide $WO_3$. It is apparent that the

EXAMPLE 24

Some ferric oxide $Fe_2O_3$, the ferric trioxide, which is of a brown color was thermally evaporated from a tungsten filament or a tantalum boat which was heated in a high vacuum upon a piece of previously well cleaned glass. Oxygen was lost as indicated by the vacuum gauges attached to the chamber and the deposit upon the sheet of glass was of a greenish brownish grey color when looked at through the coated glass. The coated glass showed a first surface reflection of 29%, a second surface reflection of 24%, a light transmission of 28%, and a light absorption of 43%. The deposit appears to be a mixture of iron oxides in which ferrous oxide predominates as upon heating the coated glass for 4 hours at 400° centigrade the heavy light absorption decreased to 12%. The thus oxidized coating would seem to be substantially composed of ferric trioxide.

EXAMPLE 25

Upon a clean piece of sheet glass there was deposited in a high vacuum by thermal evaporation of 0.5 gram of the dark green chromium sesquioxide ($Cr_2O_3$) a coating of a dark nature. The coating was of a red brown shade by transmitted light and the coated glass showed a first surface reflection of 12% and a light transmission of 31%. Thus 57% of the incident light was absorbed in the coating. After heating in air in a furnace held at 600° centigrade for one hour the coating of mixed chromium oxides was substantially converted to chromium sesquioxide and the first surface reflection changed to 14%, the light transmission increased to 64% and the light absorption decreased thereby to 22%. The heated coatings were extremely hard. The unheated deposit and the heated oxidized coating each also showed light interference color in the reflected light from their surfaces and the color was found to shift spectrally in the heating process in a manner which indicated that the refractive index of the coating was also decreasing. The final coating of chromium sesquioxide produced in this manner was of the order of .188 micron thickness.

EXAMPLE 26

In the preparation of Example 25 there was also placed in the vacuum chamber at 12 inches from the filament an aluminum coated glass mirror so that it would also receive the chromium oxide deposit formed during the evaporation. The mirror coated side was placed facing the filament and the glass was inclined at a slight angle thereto so that the opposite ends of the face were slightly closer or slightly further away from the filament than the 12 inches true for the center of the mirror. When the coated mirror was removed from the vacuum chamber one end had a reflection of 18% and was a green yellow mirror, the center had a reflection of 14% and was a green mirror, and the other end was a red mirror of 21% reflectivity. After heating the coated mirror in air at 250° centigrade for 15 to 30 minutes which did not affect the aluminum layer the respective ends were found to have their light reflectivities increased to 48%, 49% and 58% thus clearly indicating that a decrease in light absorption by the coating had occurred during the heating and oxidation as more light was then able to traverse the coating and be reflected from the backing aluminum layer. The colors in the mirrors were developed by light interference and shifted slightly when the deposit was heated and oxidized.

EXAMPLES 27 AND 28

Chromium sesquioxide in the same 0.5 gram amount was placed in a tungsten filament and thermally evaporated out of such heated filament in a high vacuum of the order of $10^{-4}$ millimeters upon two mirror coated pieces of glass placed at a distance of 22 inches from the filament. One piece of glass had previously been coated by thermal evaporation with an opaque mirror reflective layer of aluminum of about 89% reflectivity and the other piece had in a similar manner been coated with a chromium metal reflective layer of approximately 55% reflectivity. The coating of chromium oxides was deposited in each case directly upon the mirror reflective metal carried by the glass support and when each was removed from the vacuum chamber two entirely different mirrors were found to have been produced. The coated aluminum article was a mirror of front surface reflectivity of 36% and of a pure deep gold color while the coated chromium article was a mirror of front surface reflectivity of 5% of a deep red blue color. These mirrors were then heated as in Example 26 at 250° centigrade for a sufficient length of time to produce oxidation in the coatings such as 30 minutes without affecting the mirror metal coatings under the chromium oxide deposits. This resulted in an aluminum-chromium sesquioxide coated mirror having a reflectivity of 42% and a much deeper gold color and a chromium-chromium sequioxide coated mirror reflecting a pure blue color with 5% reflectivity. The mirrors were in each case quite hard and durable.

EXAMPLE 29

In the evaporation of the chromium sesquioxide in Examples 25, 26, 27 and 28 from the hot tungsten filament within the vacuum oxygen was lost from the chromium oxide as shown by a surge of gas registered at the start of the evaporation and thereafter by the vacuum gauges attached to the chamber. When the tungsten filaments were removed from the chamber after the deposition it was found that the tungsten filaments had been partially attacked and eaten away by the liberated oxygen acting upon the hot tungsten to form tungsten oxides which then evaporated with the chromium oxides. Thus, the deposits secured in the thermal evaporation also contained tungsten oxides mixed with the chromium oxides, each metallic oxide being of a lower state of oxidation. When the deposits were thereafter oxidized by heating the coated articles in air at elevated temperatures the mixed chromium and tungsten oxides each oxidized to the more highly oxidized chromium sesquioxide and tungsten trioxide as shown above and in Examples 18 to 23. In a similar manner if the chromium oxide is evaporated from a tantalum heated support or filament the oxygen liberated by the chromium sesquioxide when heated in the vacuum reacts to a considerable degree with the hot tantalum and there is deposited upon the article a mixture of chromium and tantalum oxides including the lower oxides of these metals and when such deposits are then heated in an oxygen containing atmosphere such as in air at 250° centigrade the various oxides are oxidized to chromium sesquioxide and tantalum pentaoxide. While such attack upon tungsten during the evaporation of chromium sesquioxide is negligible leading to very slight contamination in the deposit the attack upon tantalum is very considerable.

By way of further example of the use of the invention in the distillation of mixtures of metallic oxides there was applied to a tungsten filament a mixture of equal amounts of chromium sesquioxide and tantalum pentaoxide and these were thermally evaporated from the filament when it was heated to a high temperature in the vacuum. The deposit received upon a glass plate was then oxidized by heating the same at 500° centigrade for one hour which resulted in the reflection of the coated plate changing and the light absorption of the plate decreasing.

EXAMPLES 30 AND 31

By way of making a hard surface aluminum mirror article of high reflectivity which carried a layer of the hard chromium sesquioxide as a protective coating thereon there was placed in a vacuum chamber two aluminum opaque mirrors of approximately 89% reflectivity with the aluminum faces toward the tungsten evaporation element. Into the latter there was placed 0.050 gram of chromium sesquioxide and the mirrors were positioned at a distance of 15.5 and 22 inches away therefrom. The chamber was then closed and evacuated to a good vacuum and the tungsten evaporating element was then raised to a high heat and the chromium oxides evaporated and deposited upon the aluminum surfaces. After removing these coated mirrors from the vacuum chamber the one placed at 15.5 inches had a reflection value of 67% and that placed at 22 inches had a reflection of 82%. These coated glasses were then heated at 250° centigrade for 30 minutes and the reflectivities in each case improved as the coating was oxidized and became less light absorptive, the respective reflectivities changing to 69.5% and 85%. The mirrors produced in this way had a protective covering of chromium sesquioxide of very hard nature over the aluminum layer and in the article coated at the shorter distance the chromium sesquioxide coating was approximately 0.0114 micron thick and in the other article the chromium sesquioxide coating was approximately 0.0057 micron thick.

EXAMPLES 32 TO 34

Zirconium dioxide pieces weighing .110 gram were evaporated from a tungsten filament in a vacuum of $10^{-5}$ millimeters upon three pieces of previously cleaned flat glass placed at different distances away from the filament as shown in the following table. Optical measurements were made upon the coated pieces as they were removed from the chamber and again after the deposits upon the glass supports had been heated in an electric furnace in air at 540° centigrade for two hours. This brought about a decrease in the light absorption of the coated glasses as the coating was oxidized to some degree to give a coating which was free of the lower oxides substantially and composed in the main of the desired colorless zirconium dioxide. The coatings were very hard and the optical data was as follows:

tances away from the same as shown in the following table. Each piece of glass thus received a coating of somewhat different thickness from the other pieces and when the evaporation had been completed and the glasses were removed from the coating chamber each was found to show different reflectivities and light transmission values. These are shown in the following table as well as the degree of light absorption by the coated glasses. The light absorption was found to increase with the thicker coatings as expected and the presence of titanium oxides of lower oxidation state than titanium dioxide was thereby indicated as the coatings were otherwise clear and did not in any way have any metallic look. The four coated glasses were each heated at 450° centigrade in contact with air for 15 minutes and it was found that such treatment completely eliminated the absorption of light in the coated articles. Thus the light absorbing lower oxides of titanium present in the deposit were completely oxidized and converted by the heating into the highly oxidized colorless titanium dioxide which then formed the coatings. The coated glasses were as shown in the table directly useful as either first or second surface partially transparent mirrors. For such uses the coatings are quite attractive as they are very hard and durable. The coat-

| Example No. | Coating Distance, Inches | Coating Thickness, Microns | Oxidation Step | Per Cent Light Transmission | Per Cent Front Surface Reflection | Per Cent Light Absorption |
|---|---|---|---|---|---|---|
| 32 | 11 | | None | 80 | 18.5 | 1.5 |
|    | 11 | .046 | Oxidized | 83 | 17 | 0 |
| 33 | 8 | | None | 74 | 24.5 | 1.5 |
|    | 8 | .087 | Oxidized | 78.5 | 21.5 | 0 |
| 34 | 6 | | None | 78 | 20.5 | 1.5 |
|    | 6 | .154 | Oxidized | 79 | 21 | 0 |

Each of the coated articles thus produced was of use directly as a partially transparent mirror of good durability.

In Example 34 the coating is 3 quarter wave factors thick with respect to visible light of 4500 Angstrom units and the mirror reflection from this article is colored by reason of such blue light partially removed by light interference in the reflected light.

EXAMPLES 35, 36, 37 AND 38

From a small tungsten coil wound in tubular shape there was evaporated in a vacuum chamber at a vacuum of $10^{-5}$ millimeters small pieces of titanium dioxide loaded thereon which weighed 0.465 gram total. A deposit of titanium oxide material which included some of the lower oxides of titanium as well as titanium dioxide was formed upon four pieces of previously cleaned glass placed in the vacuum chamber facing the filament and located at various disings may also be used when further coatings are applied thereto as a layer in a low reflection coating for the forming of high light transmission glass. Obviously the unheated deposits besides being of undesired refractive index are also very poorly suited for use in such high transmission coatings in view of their own peculiar high light absorbing properties.

The coating thickness of Examples 36 and 38 were approximately one quarter and one half a wave factor in thickness with respect to 5500 Angstrom units yellow light.

| Example No. | Coating Distance, Inches | Coating Thickness, Microns | Oxidation Step | Per Cent Light Transmission | Per Cent First Surface Reflection | Per Cent Light Absorption | Per Cent Second Surface Mirror Reflection |
|---|---|---|---|---|---|---|---|
| 35 | 20.75 | | None | 63 | 26.5 | 10.5 | |
|    | 20.75 | .059 | Oxidized | 73 | 27 | 0 | 26.5 |
| 36 | 20 | | None | 62 | 27.5 | 10.5 | |
|    | 20 | .064 | Oxidized | 72 | 28 | 0 | 27 |
| 37 | 19.25 | | None | 60 | 28 | 12 | |
|    | 19.25 | .069 | Oxidized | 72 | 28 | 0 | 27.5 |
| 38 | 14.1 | | None | 60 | 10 | 30 | |
|    | 14.1 | .128 | Oxidized | 90 | 10 | 0 | 10 |

EXAMPLES 39, 40 AND 41

In a similar manner 0.133 gram of titanium dioxide was thermally evaporated from a tungsten filament in a vacuum of $10^{-5}$ millimeters and deposited upon three pieces of clean glass placed in the chamber at various distances away from the evaporation source. When the pieces of glass carrying the deposit thereon of titanium oxide material were measured for reflection, transmission and light absorption the results were as shown in the next table for the three coated glasses. The light absorption present in each case was removed and the deposit oxidized when the deposits were directly flamed with a Bunsen burner flame for 15 minutes. The changes in the optical properties of the coatings as against the non-oxidized or non-flamed deposits are quite striking as is readily apparent from the table of results. Each of the coated articles thus made was of direct use as a mirror of partially transparent nature.

| Example No. | Coating Distance, Inches | Coating Thickness, Microns | Oxidation Step | Per Cent Light Transmission | Per Cent First Surface Reflection | Per Cent Light Absorption |
|---|---|---|---|---|---|---|
| 39 | 20 | | None | 84 | 15 | 1 |
| | 20 | .016 | Oxidized | 85.5 | 14.5 | 0 |
| 40 | 17.3 | | None | 80 | 17.5 | 2.5 |
| | 17.3 | .024 | Oxidized | 82 | 18 | 0 |
| 41 | 14.1 | | None | 70.5 | 23 | 6.5 |
| | 14.1 | .032 | Oxidized | 76 | 24 | 0 |

EXAMPLES 42 AND 43

A small quantity of manganese dioxide $MnO_2$ was placed in a tungsten filament and thermally evaporated in a high vacuum of the order of $10^{-5}$. As the oxide was heated and thermally evaporated it lost oxygen as indicated by the vacuum gauges as was also evident in a similar manner when the titanium dioxide was thermally evaporated in the above examples. Two smooth pieces of plate glass were used during the evaporation as supports upon which the manganese oxide material was deposited, the pieces being placed at different distances away from the filament such that one received twice the thickness of coating that was formed upon the other. The deposits formed were highly absorptive but did not appear metallic in any way and were formed of a mixture of manganese oxides including the lower oxides which are highly light absorptive. After making measurements of the reflection and light transmission of the glasses carrying the deposits these coated glasses were heated for 30 minutes in air at 450° centigrade in an electric furnace for the purpose of oxidizing the deposit and forming the higher oxides of manganese from the lower oxides present in the deposit. Such heating converted the coating into a coating which was substantially manganous manganic oxide $Mn_3O_4$. The light absorption was decreased by such heating and oxidation but as the oxide produced, manganous manganic oxide, is still a somewhat dark colored material absorption of some light by the coating produced would be expected. The measurements of the light absorption and other values appear as follows. The thinner coating is of a quarter wave length thickness and the thicker coating is of a half wave length thickness of yellow light.

| Example No. | Coating Thickness, Microns | Oxidation Step | Per Cent Light Transmission | Per Cent First Surface Reflection | Per Cent Light Absorption |
|---|---|---|---|---|---|
| 42 | | None | 56 | 28 | 16 |
| | .057 | Oxidized | 74 | 14.4 | 11.6 |
| 43 | | None | 50 | 6 | 44 |
| | .114 | Oxidized | 70 | 22.2 | 7.8 |

In the foregoing general description and specific examples, it will be observed that the method comprises the initial step of depositing upon a surface by thermal evaporation in a vacuum a coating which includes lower oxides of metals capable of forming oxides of several oxidation states. The thermal evaporation step involves the use of a metallic oxide as the material evaporated. This material may be of high or low oxidation state, or a mixture of different oxides or a spinel, all of which are included within the term "metallic oxide" as used herein. Alternatively the starting material may be a metallic compound which decomposes to form an oxide when heated. In order to improve the physical properties of this film, and particularly its light transmission properties, at least some of the lower oxides present as a result of the thermal evaporation are oxidized to a higher oxide.

Since the improved physical properties of the film are to be retained under normal pressure and temperature conditions, the higher oxides formed are stable under these conditions. Therefore, the essential requirement is that the oxidation of the deposited film shall be carried out under conditions of temperature and pressure, dependent upon the particular atmosphere employed, such that the desired higher oxides are formed, the higher oxides thus formed being stable under these temperature and pressure conditions as well as under normal pressure and temperature conditions.

In order to convey a thorough understanding of the present invention to those skilled in the art, the foregoing specific examples have been included together with results of actual tests and measurements accomplished thereon. It is to be understood, however, that these specific examples are set forth for the purpose of assisting in the practice of the invention and are in no sense to be considered as limiting the scope of the appended claims.

What I claim as my invention is:

1. The method of forming on the surface of an article a continuous coating composed substantially completely of a highly oxidized solid metallic oxide having the relatively high light transmission characteristics normal to such highly oxidized solid metallic oxide, comprising providing on a heat radiating support body a metallic oxide of a metal capable of forming oxides of a plurality of different oxidation states, the metal being selected from the group consisting of aluminum, titanium, chromium, tin, zirconium, antimony, iron, tantalum, tungsten and manganese, heating the support body adjacent the surface of the article in a vacuum and thereby heating the metallic oxide to evaporate metallic oxide and deposit upon the surface a continuous and light absorbing metallic oxide coating comprising a metallic oxide of lower oxidation state and higher light absorption than that of the said highly oxidized solid metallic oxide, terminating deposition of said coating before said coating attains a thickness which would render the coating opaque when substantially completely oxidized to said highly oxidized state, and thereafter altering the optical properties of said coating to increase its light transmission characteristics by substantially completely oxidizing the oxide of lower oxidation state by subjecting the coating to an atmosphere having a partial pressure of oxygen of at least 50 mm. of mercury, and while subjecting said coating to said atmosphere heating said coating to a temperature above 200 degrees centigrade sufficient to oxidize the particular oxide of lower oxidation state to form a coating composed substantially completely of said highly oxidized solid metallic oxide.

2. The method of forming on the surface of an article a continuous coating composed substantially completely of a highly oxidized solid metallic oxide having the relatively high light transmission characteristics normal to such highly oxidized solid metallic oxide, comprising providing on a heat radiating support body a metallic oxide of a metal capable of forming oxides of a plurality of different oxidation states, the metal being selected from the group consisting of aluminum titanium, chromium, tin, zirconium, antimony, iron, tantalum, tungsten and manganese, heating the support body adjacent the surface of the article in a vacuum and thereby heating the metallic oxide to evaporate metallic oxide and deposit upon the surface a continuous and light absorbing metallic oxide coating comprising a metallic oxide of lower oxidation state and higher light absorption than that of the said highly oxidized solid metallic oxide, terminating deposition of said coating before said coating attains a thickness which would render the coating opaque when substantially completely oxidized to said highly oxidized state, and thereafter altering the optical properties of said coating to increase its light transmission characteristics by substantially completely oxidizing the oxide of lower oxidation state by subjecting the coating to an atmosphere of air at atmospheric pressure, and while subjecting said coating to said atmosphere heating said coating to a temperature above 200 degrees centigrade sufficient to oxidize the particular oxide of lower oxidation state to form a coating composed substantially completely of said highly oxidized solid metallic oxide.

3. The method of forming on the surface of an article a continuous coating composed substantially completely of a highly oxidized solid metallic oxide having the relatively high light transmission characteristics normal to such highly oxidized solid metallic oxide, comprising providing on a heat radiating support body a compound of oxygen and metals, one of the metals being capable of forming oxides of a plurality of different oxidation states, the metal being selected from the group consisting of aluminum, titanium, chromium, tin, zirconium, antimony, iron, tantalum, tungsten and manganese, heating the support body adjacent the surface of the article in a vacuum and thereby heating the metallic oxide to evaporate metallic oxide and deposit upon the surface a continuous and light absorbing metallic oxide coating comprising a metallic oxide of lower oxidation state and higher light absorption than that of the said highly oxidized solid metallic oxide, terminating deposition of said coating before said coating attains a thickness which would render the coating opaque when substantially completely oxidized to said highly oxidized state, and thereafter altering the optical properties of said coating to increase its light transmission characteristics by substantially completely oxidizing the oxide of lower oxidation state by subjecting the coating to an atmosphere having a partial pressure of oxygen of at least 50 mm. of mercury, and while subjecting said coating to said atmosphere heating said coating to a temperature above 200 degrees centigrade sufficient to oxidize the particular oxide of lower oxidation state to form a coating composed substantially completely of said highly oxidized solid metallic oxide.

4. The method of forming on a support surface a continuous coating composed substantially completely of aluminum trioxide having the relatively high light transmission characteristics of aluminum trioxide, comprising providing on a heat radiating support body an oxide of aluminum, heating the support body adjacent the support surface in a vacuum to evaporate and deposit upon the support surface a continuous and light absorbing aluminum oxide coating including an aluminum oxide of lower oxidation state than aluminum trioxide, terminating deposition of said coating before said coating attains a thickness which would render the coating opaque when substantially completely oxidized to aluminum trioxide, and thereafter altering the optical properties of said coating to increase its light transmission characteristics by substantially completely oxidizing the oxide of lower oxidation state by subjecting the coating to an atmosphere having a partial pressure of oxygen of at least 50 mm. of mercury, and while subjecting said coating to said atmosphere heating said coating to a temperature above 200 degrees centigrade sufficient to oxidize the oxide of lower oxidation state to form a coating composed substantially completely of aluminum trioxide.

5. The method of forming on a support surface a continuous coating composed substantially completely of aluminum trioxide having the relatively high light transmission characteristics of aluminum trioxide, comprising providing on a heat radiating support body aluminum trioxide, heating the support body adjacent the support surface in a vacuum to evaporate and deposit upon the support surface a continuous and light absorbing aluminum oxide coating including an aluminum oxide of lower oxidation state than aluminum trioxide, terminating deposition of said coating before said coating attains a thickness which would render the coating opaque when substantially completely oxidized to aluminum trioxide, and thereafter altering the optical properties of said coating to increase its light transmission characteristics by substantially completely oxidizing the oxide of lower oxidation state by subjecting the coating to an atmosphere having a partial pressure of oxygen of at least 50 mm. of mercury, and while subjecting said coating to said atmosphere heating said coating to a temperature above 200 degrees centigrade sufficient to oxidize the oxide of lower oxidation state to form a coating composed substantially completely of aluminum trioxide.

6. The method of forming on a support surface a coating composed substantially completely of a highly oxidized solid metallic oxide having relatively high light transmission characteristics normal to such highly oxidized solid metallic oxide, comprising providing on a heat radiating support body a compound of oxygen and metals, one of the metals being aluminum, heating the support body adjacent the support surface in a vacuum and thereby heating the compound to evaporate and deposit upon the support surface a continuous and light absorbing metallic oxide coating comprising an aluminum oxide of lower oxidation state than aluminum trioxide, terminating deposition of said coating before said coating attains a thickness which would render the coating opaque when substantially completely oxidized and thereafter altering the optical properties of said coating to increase its light transmission characteristics by substantially completely oxidizing the oxide of lower oxidation state by subjecting the coating to an atmosphere having a partial pressure of oxygen of at least 50 mm. of mercury, and while subjecting said coating to said atmosphere heating said coating to a temperature above 200 degrees centigrade sufficient to oxidize the particular oxide of lower oxidation state to form a coating composed substantially completely of said highly oxidized solid metallic oxide.

7. The method of forming on a support surface a continuous coating composed substantially completely of chromium sesquioxide having the relatively high light transmission characteristic of chromium sesquioxide, comprising providing on a heat radiating support body an oxide of chromium, heating the support body adjacent the support surface in a vacuum to evaporate and deposit upon the support surface a continuous and light absorbing chromium oxide coating including a chromium oxide of lower oxidation state than chromium sesquioxide, terminating deposition of said coating before said coating attains a thickness which would render the coating opaque when substantially completely oxidized to chromium sesquioxide, and thereafter altering the optical properties of said coating to increase its light transmission characteristics by substantially completely oxidizing the oxide of lower oxidation state by subjecting the coating to an atmosphere having a partial pressure of oxygen of at least 50 mm. of mercury, and while subjecting said coating to said atmosphere heating said coating to a temperature above 200 degrees centigrade sufficient to oxidize the oxide of lower oxidation state to form a coating composed substantially completely of chromium sesquioxide.

8. The method of forming on a support surface a continuous coating composed substantially completely of titanium dioxide having the relatively high light transmission characteristics of titanium dioxide, comprising providing on a heat radiating support body an oxide of titanium, heating the support body adjacent the support surface in a vacuum to evaporate and deposit upon the support surface a continuous and light absorbing titanium oxide coating including a titanium oxide of lower oxidation state than titanium dioxide, terminating deposition of said coating before said coating attains a thickness which would render the coating opaque when substantially completely oxidized to titanium dioxide, thereafter altering the optical properties of said coating to increase its light transmission characteristics by substantially oxidizing the oxide of lower oxidation state by subjecting the coating to an atmosphere having a partial pressure of oxygen of at least 50 mm. of mercury, and while subjecting said coating to said atmosphere heating said coating to a temperature above 200 degrees centigrade sufficient to oxidize the oxide of lower oxidation state to form a coating composed substantially completely of titanium dioxide.

9. The method of forming on a support surface a continuous coating composed substantially completely of aluminum trioxide having the relatively high light transmission characteristic of aluminum trioxide, comprising providing on a heat radiating support body an oxygen containing compound of aluminum, said compound being inherently reactive upon heating to decompose to form aluminum oxide, heating the support body adjacent the support surface in a vacuum and thereby heating the compound to decompose the compound to form aluminum oxide and to evaporate and deposit upon the support surface a continuous and light absorbing aluminum oxide coating including an aluminum oxide of lower oxidation state than aluminum trioxide, terminating deposition of said coating before said coating attains a thickness which would render the coating opaque when substantially completely oxidized to aluminum trioxide, and thereafter altering the optical properties of said coating to increase its light transmission characteristics by substantially completely oxidizing the oxide of lower oxidation state by subjecting the coating to an atmosphere having a partial pressure of oxygen of at least 50 mm. of mercury, and while subjecting said coating to said atmosphere heating said coating to a temperature above 200 degrees centigrade sufficient to oxidize the oxide of lower oxidation state to form a coating composed substantially completely of aluminum trioxide.

10. The method of forming on a support surface a continuous coating composed substantially completely of antimony tetraoxide having the relatively high light transmission characteristic of antimony tetraoxide, comprising providing on a heat radiating support body an oxygen containing compound of antimony, said compound being inherently reactive upon heating to decompose to form antimony oxide, heating the support body adjacent the support surface in a vacuum and thereby heating the compound to decompose the compound to form antimony oxide and to evaporate and deposit upon the surface a continuous and light absorbing antimony oxide coating including an antimony oxide of lower oxidation state than antimony tetraoxide, terminating deposition of said coating before said coating attains a thickness which would render the coating opaque when substantially completely oxidized to antimony tetraoxide, and thereafter altering the optical properties of said coating to increase its light transmission characteristics by substantially completely oxidizing the oxide of lower oxidation state by subjecting the coating to an atmosphere having a partial pressure of oxygen of at least 50 mm. of mercury, and while subjecting said coating to said atmosphere heating said coating to a temperature above 200 degrees centigrade sufficient to oxidize the oxide of lower oxidation state to form a coating composed substantially completely of antimony tetraoxide.

11. In the method of making mirrors, the deposition on a reflective mirror coating of a continuous coating composed substantially completely of a highly oxidized solid metallic oxide having the relatively high light transmission characteristic of such highly oxidized metallic oxide, comprising providing on a heat radiating support body a metallic oxide of a metal capable of forming oxides of several different oxidation states, the metal being selected from the group consisting of aluminum, titanium, chromium, tin, zirconium, antimony, iron, tantalum, tungsten, and manganese, heating the support body adjacent the mirror coating in a vacuum and thereby heating the metallic oxide to evaporate and deposit upon the mirror coating a continuous and light absorbing metallic oxide coating including a metallic oxide of lower oxidation state than that of the said highly oxidized metallic coating, terminating deposition of said coating before said coating attains a thickness which would render the coating opaque when substantially completely oxidized to said highly oxidized state, thereafter altering the optical properties of said coating to increase its light transmission characteristics by substantially completely oxidizing the oxide of lower oxidation state by subjecting the coating to an atmosphere having a partial pressure of oxygen of at least 50 mm. of mercury, and while subjecting said coating to said atmosphere heating said coating to a temperature above 200 degrees centigrade sufficient to oxidize the particular oxide of lower oxidation state to form a coating composed substantially completely of said highly oxidized solid metallic oxide.

12. The method of making transparent mirrors by applying to a smooth surface of a transparent support a continuous coating composed substantially completely of a highly oxidized solid metallic oxide having the relatively high light transmission characteristics normal to such highly oxidized solid metallic oxide, comprising providing on a heat radiating support body a metallic oxide of a metal capable of forming oxides of several different oxidation states, the metal being selected from the group consisting of aluminum, titanium, chromium, tin, zirconium, antimony, iron, tantalum, tungsten, and manganese, heating the support body adjacent the smooth surface in a vacuum and thereby heating the metallic oxide to evaporate and deposit upon the support surface a continuous and light absorbing metallic oxide coating including a metallic oxide of lower oxidation state than that of the said highly oxidized metallic oxide, terminating deposition of said coating before said coating attains a thickness which would render the coating opaque when substantially completely oxidized to said highly oxidized state, and thereafter altering the optical properties of said coating to increase its light transmission characteristics by substantially completely oxidizing the oxide of lower oxidation state by subjecting the coating to an atmosphere having a partial pressure of oxygen of at least 50 mm. of mercury, and while subjecting said coating to said atmosphere heating said coating to a temperature above 200 degrees centigrade sufficient to oxidize the particular oxide of lower oxidation state to form a coating composed substantially completely of said highly oxidized solid metallic oxide.

13. The method of forming on a support surface a continuous coating composed substantially completely of a highly oxidized solid metallic oxide having the relatively high light transmission characteristics normal to such highly oxidized solid metallic oxide, which comprises depositing on said surface by thermal desposition in a vacuum a uniform continuous coating of metallic oxide, the metal of said oxide being selected from the group consisting of aluminum, titanium, chromium, tin, zirconium, antimony, iron, tantalum, tungsten and manganese, and being capable of forming oxides of several oxidation states, terminating deposition of said coating before said coating attains a thickness which would render the coating opaque when substantially completely oxidized to said highly oxidized state, and thereafter altering the optical properties of said coating to increase its light transmission characteristics by substantially completely oxidizing the oxide of lower oxidation state by subjecting the coating to an atmosphere having a partial pressure of oxygen of at least 50 mm. of mercury, and while subjecting said coating to said atmosphere heating said coating to a temperature above 200 degrees centigrade sufficient to oxidize the particular oxide of lower oxidation state to form a coating composed substantially completely of said highly oxidized solid metallic oxide.

14. The method of forming on a support surface a continuous coating composed substantially completely of a highly oxidized solid metallic oxide having the relatively high light transmission characteristics of the highly oxidized solid metallic oxide, which comprises depositing on said surface by thermal deposition in a vacuum a uniform continuous coating of metallic oxide, the metal of said oxide being selected from the group consisting of aluminum, titanium, chromium, tin, zirconium, antimony, iron, tantalum, tungsten and manganese, and being capable of forming oxides of several oxidation states, the coating including a metallic oxide of lower oxidation state than that of the desired coating, terminating deposition of said coating before said coating attains a thickness which would render the coating opaque when substantially completely oxidized to said highly oxidized state, and thereafter altering the optical properties of said coating to increase its light transmission characteristics by substantially completely oxidizing the oxide of lower oxidation state by subjecting the coating to an atmosphere having a partial pressure of oxygen of at least 50 mm. of mercury, and while subjecting said coating to said atmosphere heating said coating to a temperature above 200 degrees centigrade sufficient to oxidize the particular oxide of lower oxidation state to form a coating composed substantially completely of said highly oxidized solid metallic oxide.

15. The method of forming on a support surface of a transparent body a highly transparent continuous coating composed substantially completely of a highly oxidized solid metallic oxide having the relatively high light transmission characteristics of the highly oxidized solid metallic oxide, which comprises depositing on said surface by thermal deposition in a vacuum a uniform continuous coating of metallic oxide, the metal of said oxide being selected from the group consisting of aluminum, titanium, chromium, tin, zirconium, antimony, iron, tantalum, tungsten and manganese, and being capable of forming oxides of several oxidation states, the coating including a metallic oxide of lower oxidation state than that of the desired coating, terminating deposition of said coating before said coating attains a thickness which would render the coating opaque when substantially completely oxidized to said highly oxidized state, and thereafter altering the optical properties of said coating to increase its light transmission characteristics by substantially completely oxidizing the oxide of lower oxidation state by subjecting the coating to an atmosphere having a partial pressure of oxygen of at least 50 mm. of mercury, and while subjecting said coating to said atmosphere heating said coating to a temperature above 200 degrees centigrade sufficient to oxidize the particular oxide of lower oxidation state to form a coating composed substantially completely of said highly oxidized solid metallic oxide.

16. The method of forming on a support surface a continuous coating effective to produce color by light ray interference and composed substantially completely of a highly oxidized solid metallic oxide having the relatively high light transmission characteristics of the highly oxidized solid metallic oxide, comprising providing on a heat radiating support body a metallic oxide of a metal capable of forming oxides of several different oxidation states, the metal being selected from the group consisting of aluminum, titanium, chromium, tin, zirconium, antimony, iron, tantalum, tungsten and manganese, heating the support body adjacent the support surface in a vacuum and thereby heating the metallic oxide to evaporate and deposit upon the support surface a continuous and light absorbing metallic oxide coating including a metallic oxide of lower oxidation state than that of the desired coating, terminating the deposition of said coating when it has a thickness which when it is substantially completely oxidized to its highly oxidized state represents an odd integral number of quarter wave length factors of visible light of a predetermined wave length and remains partially transparent to produce color by light interference of light of the predetermined wave length, and thereafter altering the optical properties of said coating to increase its light transmission characteristics by substantially completely oxidizing the oxide of lower oxidation state by subjecting the coating to an atmosphere having a partial pressure of oxygen of at least 50 mm. of mercury, and while subjecting said coating to said atmosphere heating said coating to a temperature above 200 degrees centigrade sufficient to oxidize the particular oxide of lower oxidation state to form a coating composed substantially completely of said highly oxidized solid metallic oxide.

ARTHUR R. WEINRICH.

REFERENCES CITED

The following references are of record in the file of this patent:

UNITED STATES PATENTS

| Number | Name | Date |
|---|---|---|
| 2,118,795 | Littleton | May 24, 1938 |
| 2,281,474 | Cartwright | Apr. 28, 1942 |
| 2,366,516 | Geffcken et al. | Jan. 2, 1945 |
| 2,456,899 | Strong | Dec. 21, 1948 |

FOREIGN PATENTS

| Number | Country | Date |
|---|---|---|
| 504,620 | Great Britain | Apr. 25, 1939 |